United States Patent Office 2,830,243
Patented Apr. 8, 1958

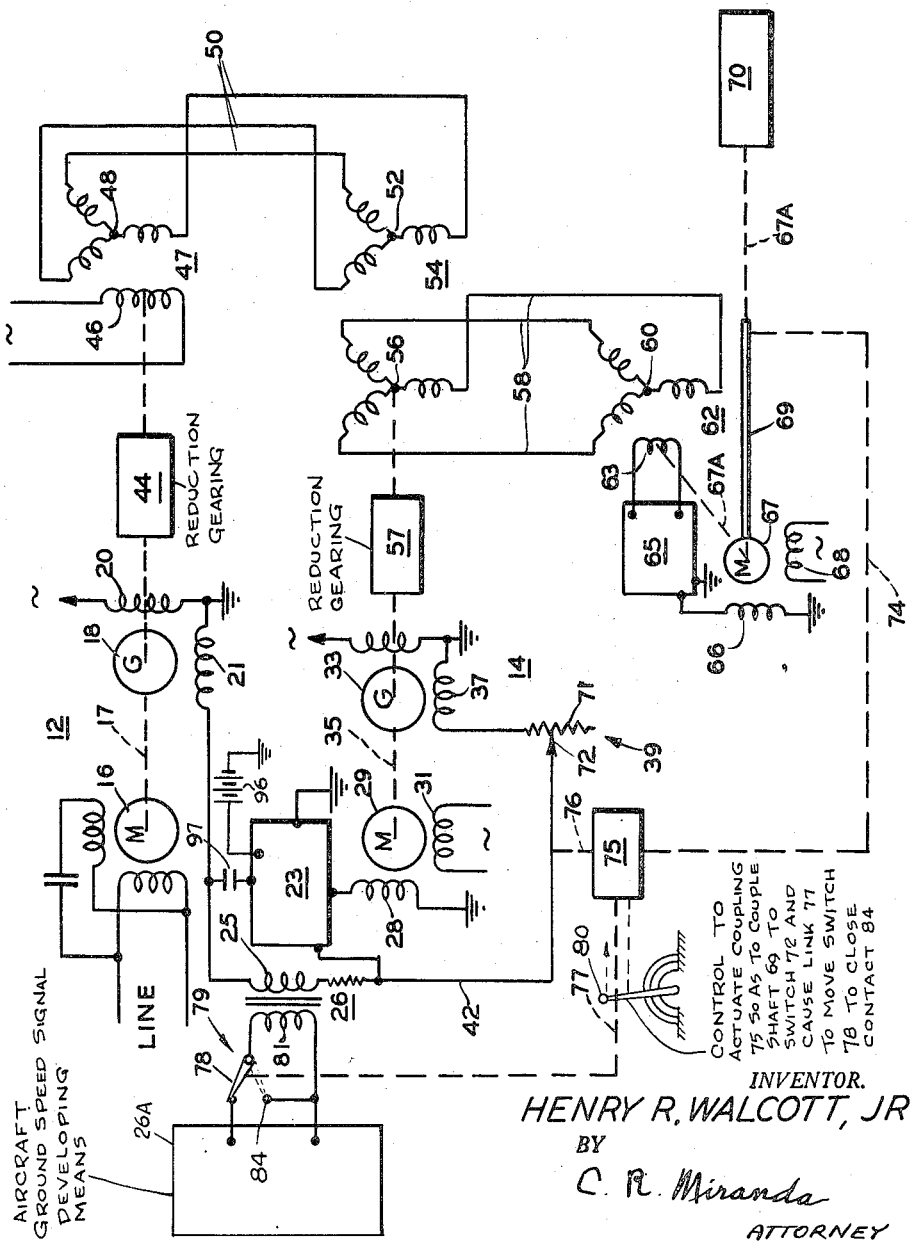

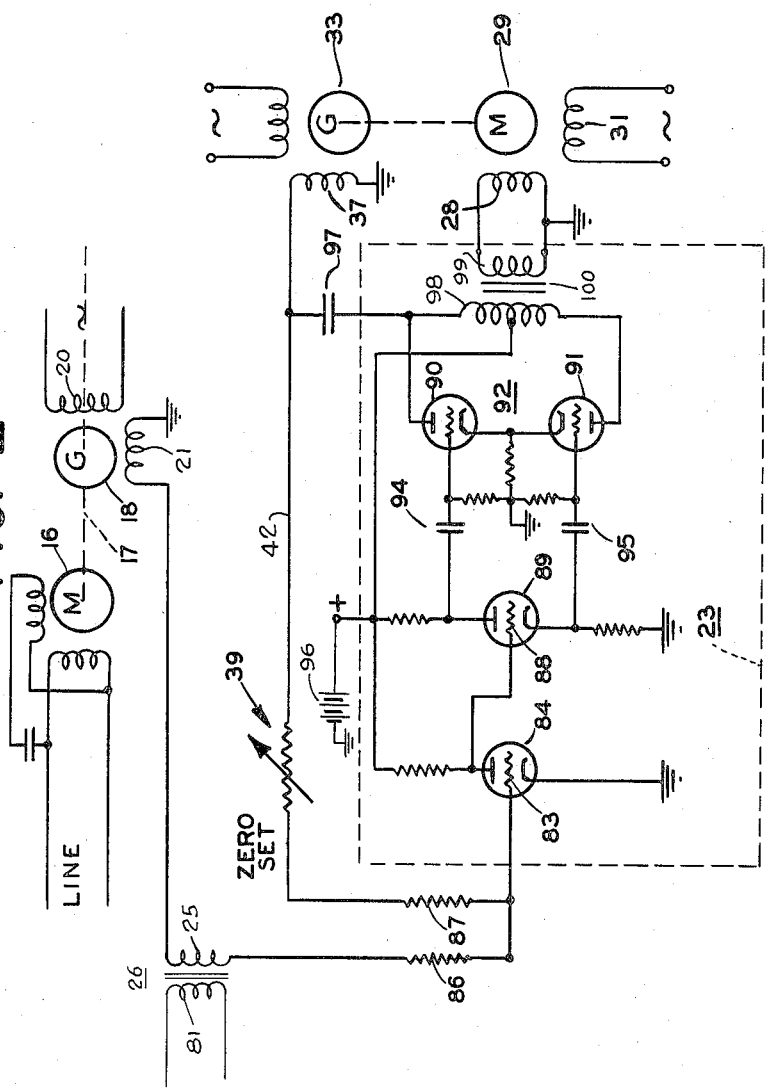

2,830,243

ELECTRICAL CONTROL SYSTEM

Henry R. Walcott, Jr., Allendale, N. J., assignor to Bendix Aviation Corporation, Teterboro, N. J., a corporation of Delaware Application March 27, 1952, Serial No. 278,792

12 Claims. (Cl. 318—28)

This invention in general relates to electrical control systems, and more particularly to such systems which provide for extremely wide range of accurately controlled speeds of an output member.

The present invention is in the nature of an improvement upon, or addition to, an electrical control system of the kind shown and described in my copending application Serial No. 278,793, filed March 27, 1952, for electrical control system wherein a change in speed of one of two motor-generator sets driving into a differential mechanism will provide an output equal to the differential speed of the motors; the angular displacement of a differential shaft at any instant being proportional to the integral with time of an unbalancing signal voltage causing the change in speed of one of the two motor-generator sets.

It is to be understood that the present invention is not confined in its utility to specific features or details of the disclosure of my copending application, and that specific reference herein to that disclosure is intended primarily to facilitate an understanding of the principle of the present invention.

The present invention contemplates a system for linearly controlling the speed of an output member from zero to a desired maximum R. P. M. The system comprises a pair of motor generator sets, as shown in my copending application, but differing therefrom, in one respect, insofar as the present system provides for an electrical differential arrangement which takes the place of the mechanical differential arrangement. The electrical differential arrangement comprises a synchro transmitter driven from a constant speed motor, the latter being electrically connected to an inductive differential synchro which is driven by a variable speed motor. A signal voltage representing the difference in speeds of the motors is produced in the differential synchro and transmitted to a displaceable inductive control transformer which actuates a follow-up arrangement having an output shaft; the shaft being responsive to the differential speed of the motors. Novel means are provided for zero setting the output shaft with no unbalancing signal voltage, whereby the speeds of the generators are maintained equal. Additional novel means in the form of an impedance network is provided for eliminating out-of-phase voltage components emanating from the generators, particularly the 90° out-of-phase voltage components, which tend to saturate a control amplifier and decrease the sensitivity of the system.

An object of the present invention, therefore, is to provide a novel electrical control system which enables the achievement of extremely wide range of accurately controlled speeds of an output member.

Another object is to provide a novel electrical control system which provides an electrical differential arrangement in combination with a variable speed motor and a constant speed motor whereby accurately controlled speeds of an output member are obtained.

A further object is to provide a novel electrical control system wherein an output member is moved by servo action in accordance with a speed differential signal from an electrical differential arrangement and loading of the output member has no effect upon the differential arrangement.

Still another object is to provide novel means for maintaining zero displacement of an output member in the absence of an unbalancing control signal which normally effects displacement of the output member.

A still further object is to provide in an electrical control system a novel impedance network in a speed determining section of the system wherein exact phase relationships between voltages at the input of a control amplifier must be maintained.

The above and other objects and advantages of the present invention will appear more fully hereinafter from a consideration of the detailed description which follows taken together with the accompanying drawings wherein one embodiment of the invention is illustrated.

In the drawings wherein like reference characters refer to like parts throughout the several views:

Fig. 1 is a schematic illustration of the electrical control system embodying the present invention;

Fig. 2 is a schematic illustration of the control amplifier of Fig. 1 and shows in addition, an impedance network for maintaining exact phase relationships between the voltages combined at the input of the amplifier.

Referring now to the drawings for a more detailed description of the present invention, and more particularly to Fig. 1 wherein one embodiment thereof is clearly illustrated, an electrical control system is shown which comprises a constant speed channel 12 and a variable speed channel 14; the former channel comprising a constant speed conventional two phase motor 16 energized from an alternating current source (not shown). The armature of an alternating current generator 18 is driven by motor 16 through a driving connection 17 shown as a broken line in Fig. 1. Generator 18 has a winding 20 excited from the same alternating current source as motor 16, and an output winding 21. The amplitude of the voltage output developed in winding 21 is proportional to the speed of operation of motor 16, which is constant with constant line frequency.

The output voltage of generator 18 is applied as the input signal voltage to a control amplifier 23 (shown as a box in Fig. 1) through the secondary winding 25 of a transformer generally designated by the numeral 26, the function of which will be described hereinafter. Connected to the output of amplifier 23 is the variable phase winding 28 of a two phase motor 29 which includes a fixed phase winding 31 energized from a suitable source of alternating current or from the same source which energizes motor 16. As is well understood by those skilled in the art, the direction and speed of operation of motor 29 is determined by the phase and amplitude of the output of amplifier 23. Coupled for rotation with motor 29 is the armature of a generator 33 through a driving connection 35, shown as a broken line in Fig. 1. Generator 33 includes an output winding 37 which is connected in series with the input of amplifier 23 by way of a potentiometer 39, the function of which will be set forth hereinafter, and a lead 42.

A voltage corresponding to the speed of operation of motor 29 is developed in winding 37 which is algebraically added to the input voltage to amplifier 23 from generator 18 to control the speed of operation of motor 29. The voltage from generator 33 is in phase opposition with the input voltage to the amplifier whereby the resultant signal is amplified to supply more or less power to motor 29 so as to vary the motor 29 speed to reduce the summation of the generator output voltages to a small finite value approaching but not equal to zero. In this manner, the speed of operation of motor 29 is held at a constant value as determined by the value of the output voltage from generator 18. Through the interconnection of generators 18 and 33, a change in speed of motor 16 will produce an equivalent change in the speed of motor 29 so that equality in speeds will be maintained. In the same manner, changes in line voltage and line frequency will produce equal changes in speeds of the motors so that equality of the two speeds will not be destroyed. Since the two generators cannot be made absolutely identical, potentiometer 39 is provided to compensate for the difference between the two channels 12 and 14 in obtaining exactly equal speeds. The potentiometer 39 may also be operated semiautomatically by 69, 74, 75 and 76 as will be described hereinafter.

Coupled to generator 18 and driven by motor 16 through a suitable gear reduction train 44, shown as a box, is the single phase rotor winding 46 of an inductive synchro transmitter 47 which includes a three phase stator winding 48 inductively coupled to the rotor winding. Winding 46 is supplied with a fixed A. C. excitation voltage while winding 48 is connected by suitable leads 50 to a three phase stator winding 52 of a differential synchro 54, the latter having a three phase rotor winding 56 adapted to be rotated by motor 29 and coupled to generator 33 through a reduction gear train 57, shown as a box.

Rotation of rotor winding 46 by motor 16 induces in stator winding 48 a voltage which gives rise to a rotating magnetic field therein and in stator winding 52 of differential synchro 54. Stator windings 48 and 52 are connected back-to-back in such a way that the output from rotor winding 56 represents the difference between the rotational speeds of synchros 47 and 54. Thus, when rotor windings 46 and 56 are driven by their respective motors 16 and 29 in the same direction and at the same speed, the electrical output of rotor winding 56 is stationary or zero. A deviation from equality in the speeds of the motors 16 and 29 will cause the electrical output from rotor winding 56 to rotate at a speed equal to the difference in speed between the two rotor windings 46 and 56 and in a direction which favors the winding which is moving faster.

Connected to rotor winding 56 by way of leads 58 is a three phase stator winding 60 of a synchro control transformer 62 having a single phase rotor winding 63 connected to the input of a conventional amplifier 65, shown as a box. The output from amplifier 65 is fed to the variable phase winding 66 of a two phase motor 67 which has a fixed phase winding 68 energized from a suitable source of alternating current. Motor 67 has an output shaft 69 which drives rotor winding 63 through a gear reduction train 67A shown as a broken line, the foregoing arrangement constituting a follow-up. Connected to output shaft 69 through the same gear reduction train 67A is a counter-type indicator 70, shown as a box.

Assuming certain conditions of operation of the foregoing arrangement, when motors 16 and 29 are at rest the magnetic fields in rotors 46 and 56 are stationary or at zero and, therefore, output shaft 69 remains stationary with rotor winding 63 in a position relative to winding 60 corresponding to the position of winding 46 relative to winding 48. Upon rotation of winding 46 relative to winding 48 with rotor winding 56 stationary, a control signal would be induced in rotor winding 63 and in turn applied to the control winding 66 of motor 67 so as to cause rotation of the motor 67 and through gear train 67A the rotation of rotor winding 63 in a direction relative to windings 60 to null the induced signal voltage. Thus, the rotor winding 63 would be rotated by the motor 67 so as to follow the mechanical movement of the rotor winding 46. Similarly, rotation of the rotor winding 56 of differential synchro 54 while rotor winding 46 remains stationary would produce an error signal which would cause the motor 67 to rotate the follow up winding 63 in a direction to null the error signal. If both rotor winding 46 and rotor winding 56 are displaced simultaneously, the error signal developed are proportional and equal, respectively, to the algebraic sum of the displacement of the two windings 46 and 56. The arrangement is such that upon a simultaneous displacement of the windings 46 and 56 in a like direction and at the same speed, the displacement of the one serves to null the displacement effect of the other and the algebraic sum of the displacements of the windings 46 and 56 is a resultant differential zero error signal in winding 60. Moreover, upon the speed of the rotation of the one winding being different from that of the other winding, the algebraic sum of the displacements of the windings 46 and 56 results in the development by the differential synchro 54 of a resultant differential error signal voltage corresponding to the difference in speed of the motors 16 and 29. If the direction and speeds of both motors 16 and 29 are identical then, the revolving magnetic field in stator winding 52, caused by rotation of rotor 46, will be in correspondence with the mechanical rotation and direction of rotor winding 56 of differential synchro 54 whereby a zero resultant signal voltage is present in winding 60. If the correspondence in speeds of motors 16 and 29 is destroyed so that motor 29 leads or lags motor 16, a resultant signal is effected in rotor winding 56 and transmitted to stator winding 60. The resultant signal corresponds to the differential of the speeds of both motors and will induce in rotor winding 63 a signal voltage proportional thereto. This differential speed signal is amplified by amplifier 65 to drive motor 67 and output shaft 69 at a speed corresponding to the differential speed of the motors or generators. Motor 67 also drives rotor winding 63 in a direction to bring it to null. It is apparent that as long as a differential speed signal is present in rotor winding 63, it will be constantly seeking null and in this way rotation of output shaft 69 is effected.

The present invention contemplates a wide range of accurately controlled speeds of output shaft 69 and this is accomplished by providing an additional or control voltage of less magnitude than the voltage generated by generator 18 by way of transformer 26, connected to an unbalancing signal source 26A, either in phase or 180° out of phase with the voltage from generator 18 going to amplifier 23. Motor 29 will change speed by an amount proportional to the additional voltage at 26 without affecting the speed of motor 16. If the control voltage is in phase with the input signal voltage at amplifier 23, motor 29 will speed up to rotate rotor winding 56 at a greater speed than that of motor 16 and rotor winding 46, thereby effecting a larger signal in control transformer 62 to effect driving of output shaft 69 in one direction. Conversely, if the additional voltage from transformer 26 is 180° out of phase with the output of generator 18, then the speed of motor 29 will decrease below that of motor 16 to effect a signal voltage in rotor winding 56 of opposite phase to drive motor 67 and shaft 69 in a reverse direction. In the assumptions made above, the direction and speed of output shaft 69 depends upon whether the unbalancing additional voltage at 26 is added to or subtracted from the output of generator 18, and the amplitude of the unbalancing signal. Since motors 16 and 29 do not have to be brought to extremely low speeds, linear operation of output shaft 69 at very low speeds may be obtained because the shaft is responsive only to the differential speed of the motors. It is to be noted that motors 16 and 29 are always operating at speeds above zero, regardless of the speed of output shaft 69. For this reason, zero output from the system, i. e., zero speed of shaft 69, does not represent a unique condition and such effects as static friction and electrical nulls are never encountered in the speed channels. In addition, since output shaft 69 is moved by servo action in accordance with the electrical output of differential synchro 54, loading of the shaft 69 produces no effect on the speed determining motor generator sets. The servo may be designed to provide any value of torque required without affecting the accuracy of the speed determining components.

Inasmuch as it is extremely difficult to provide two generators which are identical as far as the amplitudes of their output voltages are concerned, compensating means must be provided so as to obtain substantially equal values of output voltages from each generator when they are running at the same speed. It is apparent that if the voltage output from generator 33 varies from its predetermined value for a predetermined speed of generator 18, then the speed of motor 29 will not be equal to the speed of motor 16 and an inequality in speed will result to effect rotation of shaft 69. The compensating means comprises the potentiometer 39 which has a resistance 71 connected to the output winding 37 of generator 33 and a movable tap 72 connected to amplifier 23. By varying the position of tap 72 along resistance 71, the amplitude of the voltage from generator 33 can be made substantially equal to the amplitude of the voltage from generator 18 to run the motors at equal speeds. Of course, the amplitude of the voltage from generator 33 is always made somewhat smaller than that from generator 18 so as to provide the necessary error signal to drive motor 29 in one direction.

Output shaft 69 is coupled to movable tap 72 by way of an actuating linkage 74, shown as a broken line, coupling means 75 and actuating linkage 76 which may comprise any driving connection well known in the art, and includes coupling means 75, shown as a box, which serves to connect and disconnect linkage 74 to linkage 76 and thereby shaft 69 with tap 72. A second linkage 77, shown as a broken line, is connected to the movable arm 78 of a single-pole double-throw switch 79 and may be actuated by suitable means, such as an operator-operative control lever 80 arranged to simultaneously actuate the coupling 75 to disconnect the linkage 74 and 76 and adjust switch 78 to the position shown. In the last-mentioned adjusted position, the switch arm 78 is in circuit with a primary winding 81 of transformer 26 and an unbalancing signal source 26A which may be an aircraft ground speed signal developing means of conventional type. When contact arm 78 is in the full line position, unbalancing signals from the signal source 26A are applied to the system. However, upon operation of the control lever 80 in the broken line arrow direction, the arm 78 is moved to the broken line position closing contact 84 so that the signal source 26A is disconnected and coupling means 75 couples linkage 74 to linkage 76. Thus, coupling means 75 may be actuated simultaneously with the switch 78 to "switch-in" or "switch-out" the signal source 26A with the system. The foregoing elements are so arranged that when coupling means 75 connects shaft 69 with potentiometer tap 72 so as to cause shaft 69 to adjust the latter, switch arm 78 is moved to the broken line position to close contact 84 shunting the primary winding 81. Conversely, when coupling means 75 is actuated by the operator-operative control lever 80 to decouple shaft 69 from tap 72, contact arm 78 is moved to the full line position to connect the signal source 26A into the system.

The foregoing arrangement constitutes a "zero-setting" arrangement whereby output shaft 69 may be set to zero in the absence of an unbalancing signal in transformer 26. Considering now the operation of the above arrangement, let it be assumed that no control signal has been applied to the system at 26 and output shaft 69 is rotating due to variations in amplitude of the output voltage from generator 33 as compared to the amplitude of the voltage from generator 18. To correct this condition, the output voltage must be made to correspond substantially with the output voltage from generator 18. This is accomplished by actuating coupling means 75 by control lever 80 so as to connect shaft 69 with tap 72 whereby switch arm 78 is brought to the broken line position. Rotation of shaft 69, now moves tap 72 in a direction to correct the output from generator 33 to remove the unbalance in speeds so that the shaft will come to rest and remain so. When it is desired to apply a control signal at 26 to the system, coupling means 75 is actuated by control lever 80 so as to uncouple shaft 69 from tap 72.

In the system described thus far, extreme care must be taken to maintain exact phase relationships between the voltages combined at the input of control amplifier 23. Regardless of the way in which they are combined, any phase difference between these voltages other than in phase or 180° out-of-phase will give rise to a relatively large out-of-phase component of voltage, particularly a 90° out-of-phase voltage component, at the amplifier input which cannot be reduced by alteration in the speed of motor 29 and generator 33, the normal control mechanism of the system. If large enough, the out-of-phase component at the input will tend to saturate the amplifier, affect its gain, and thereby reduce the symmetry, linearity, and stability of the system.

Fig. 2 discloses a schematic illustration of amplifier 23 and only includes elements of the system shown in Fig. 1 necessary to clearly illustrate the operation of the novel arrangement involved in maintaining exact phase relationship between the voltages combined at the input of the amplifier. The unbalancing signal at 26, the voltage output from generator 18 and the feedback signal from generator 33 are shown in Fig. 2 as being fed to the grid 83 of an amplifier triode tube 84 through resistances 86 and 87, respectively. The algebraic summation of signals is amplified by tube 84, and the output thereof is fed to the grid 88 of a triode tube 89 which serves as a phase splitter. Tube 89 supplies the grids of tubes 90 and 91 of a conventional push-pull power amplifier, generally designated by the numeral 92, with signals of opposed phase through a pair of coupling condensers 94 and 95. A battery 96 provides a source of direct current for the plate circuits of the tubes 84, 89, 90 and 91. As shown schematically in Fig. 2, the tubes 90 and 91 operate in conventional manner, under control of the signal pulses applied to the grids thereof by the coupling condensers 94 and 95 so as to cause in turn pulsating signals to be applied to opposite halves of a split primary winding 98 inducing in the secondary winding 99 of transformer 100 an A. C. signal of a frequency and phase determined by the combined A. C. control signal applied to the input of the amplifier 23. The induced signal in the secondary winding 99 is in turn applied across the winding 28 of the motor 29 to control the direction and speed of rotation thereof. Amplifier 23 is conventional and further explanation thereof is believed unnecessary since it is of a type well known to those skilled in the art.

Connected between the output and input of amplifier 23 is a condenser 97 which prevents the amplifier D. C. power supply voltage from appearing at the amplifier input and which together with the impedance of output winding 37 and the impedance of the amplifier output stage comprises a novel impedance network for cancelling out-of-phase voltage present at the amplifier input. By providing a secondary feedback path which includes condenser 97 between the amplifier output and input, out-of-phase voltages, which would cause heating of the windings of motor 29 and the other effects mentioned hereinbefore, are cancelled out. It is readily apparent that the primary feedback path through generator 33 has no ability to do this regardless of its speed, since its output phase is independent of the amplifier phase output.

Of course, so long as the signals at the input to the amplifier 23 are perfectly aligned in phase relation, i. e. in phase with or 180 degrees out of phase with the controlling or combined signals, there would be no need for the feed back provided by the condenser 97. However, such perfect alignment while conceivable in theory, is not necessarily true in practice, and in order to correct at least in part for the conditions resulting from the presence of signal components which are out of phase alignment with the combined signals and which in practice are found to exist, there has been provided a secondary feed back or impedance network including the condenser 97 which senses the presence of the out of phase alignment components applied to the output transformer 100 of the amplifier 23.

As shown in Fig. 2, the condenser 97 is connected between line 42 leading to the input of the amplifier 23 and the line leading from the plate of the tube 90 to the primary winding 98 of the output transformer 100 so as to apply a negative feed back signal proportional to the sensed out of phase components at the output and a feed back signal in phase opposition to the out of phase components applied at the input to the amplifier 23 so as to tend to reduce the out of phase components causing the sensed phase to arise at the output and effectively diminish the over-all out of phase components for greater accuracy of control.

If such a feed back is not provided, the out of phase components tend to saturate the amplifier and thereby obscure the true operating signals in the circuit so as to introduce an error into the control and cause useless power to be delivered to the motor 29.

The present invention may be readily used as an electrical integrator. For example, if the control signal voltage introduced in transformer 26 be from a ground speed signal developing means such as 26A and is proportional to the speed ground of an object such as an aircraft, the angular displacement of output shaft 69 at any instant after start, will be proportional to the integral of the signal voltage with the time for which it is applied. Thus by connecting counter or indicator 70 to shaft 69, indications of distance traveled by the object may be obtained.

When the present invention is used as an integrator for computing ground distance traveled by aircraft, the differential speed of motors 16 and 29, and therefore, the output signal of differential synchro 54 correspond to the ground speed signal. As a result, indicator 70 will effect indications of ground distance traveled.

It will now be readily apparent that the present invention provides a novel system which provides an extremely wide range of accurately controlled speeds of an output member or shaft 69. By providing an output member 69 moved by servo action in accordance with a differential signal representing the difference between the speeds of a constant speed motor 16 and a variable speed motor 29, loading of the output member 69 produces no effect upon a speed determining section which includes the motors 16 and 29.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a system of the type described, a motor driven at a predetermined speed, a second variable speed motor, signal developing means driven by said first and second-mentioned motors, signal input circuit means for said second motor including said driven means to supply counterbalancing signals for maintaining the speed of said second motor at said predetermined speed, other means in controlling relation with said second motor for supplying an unbalancing signal to vary the speed of operation of said second motor from said predetermined speed, a first signal generator connected for operation by said first motor for developing a signal corresponding to the speed of said first motor, a second signal generator connected for operation by said second motor for developing a signal voltage corresponding to the differential speed of said motors, a null-seeking device in circuit with said second signal generator and adapted to develop a signal voltage when the speeds of said motors are unequal, a motor operable by said last signal voltage, and a displaceable output member movable by said last-mentioned motor, the amount of movement of said member corresponding to the integral of said unbalancing signal for the time during which it has been applied.

2. In a system of the type described, a constant speed motor, an inductive transmitter comprising a rotor winding and a stator winding, means drivably connecting said rotor winding with said motor whereby a moving magnetic field is developed in said stator winding whose speed corresponds to the speed of said motor, a variable speed motor, an inductive differential device having a rotor winding connected for driving by said variable speed motor and a stator winding connected to the stator winding of said inductive transmitter, said last mentioned rotor winding adapted to develop a signal voltage corresponding to the differential speed of said motors, motive means operative by the last mentioned signal voltage, and a displaceable output member operable by said motive means whereby the displacement of said member corresponds to the differential speed of said constant and variable speed motors.

3. A control system comprising a constant speed motor, a variable speed motor, a rate signal generator connected for operation by said constant speed motor for developing a control signal, a second rate signal generator connected for operation by said variable speed motor for developing a signal corresponding to the speed of said variable speed motor, means for algebraically adding said signals and for coupling the resultant signals to said variable speed motor to control the speed of said variable speed motor, means for setting the speed of said variable speed motor, said setting means connected in the output circuits of both of said rate signal generators, and means responsive to the difference in speeds of both said motors to control said setting means for maintaining the speeds of said motors substantially equal.

4. A control system comprising a constant speed motor, a variable speed motor, a first signal generator connected for operation by said constant speed motor for developing a signal corresponding to the operation of the constant speed motor, a second signal generator electrically associated with said first generator and connected for operation by said variable speed motor for developing a signal corresponding to the difference in speeds of both motors, motive means connected for operation in accordance with said last named signal, output circuits including a rate signal generator connected for operation by said constant speed motor for developing a control signal, a second rate signal generator connected for operation by said variable speed motor for developing a signal corresponding to the speed of the last motor, means connecting the output circuits of said rate signal generators for algebraically adding the last two signals to control the speed of said variable speed motor, and resistance means in circuit with the outputs of said rate signal generators and responsive to the operation of said motive means for varying the algebraic summation of said outputs to thereby maintain the speeds of said motors substantially constant.

5. A control system comprising a constant speed motor, a variable speed motor, a first signal generator connected for operation by said constant speed motor for developing a signal corresponding to the operation of the constant speed motor, a second signal generator electrically associated with said first generator and connected for operation by said variable speed motor for developing a signal corresponding to the difference in speeds of both motors, motive means including an output member responsive to the last named signal and movable in accordance therewith, output circuits including a rate signal generator connected for operation by said constant speed motor for developing a control signal, a second rate signal generator connected for operation by said variable speed motor for developing a signal corresponding to the speed of the last motor, means connecting the output circuits of said rate signal generators for algebraically adding the last two signals to control the speed of said variable speed motor, a resistance in circuit with the output of said second rate signal generator, and a movable tap operable by said output member and in circuit with the outputs of both said rate signal generators, said tap being movable by said output member to adjust the value of said resistance to vary the output from said second rate signal generator whereby the algebraic summation of the rate signal generator outputs supplied to said variable speed motor is brought to a value to maintain the speeds of both motors substantially constant.

6. For use with a system for indicating the distance traveled by a craft, said system including means for developing a control signal corresponding to the speed of the craft; the combination comprising a motor driven at a predetermined speed, a second variable speed motor, signal developing means driven by said first and second-mentioned motors, signal input circuit means for said second motor including said driven means to supply counter balancing signals for maintaining the driven speed of said second motor at said predetermined speed, other means in circuit with said second motor for supplying said second motor with said first-mentioned control signal to cause said second motor to be driven at a speed which deviates from said predetermined speed by an amount corresponding to the speed of the craft, a signal generator operable by said first motor and adapted to develop a signal voltage corresponding to the speed of said first motor, a second signal generator in circuit with said first generator and operable by said second motor for developing a signal voltage corresponding to the difference in speed of said motors, receiver means in circuit with said second signal generator and adapted to develop a signal voltage, motive means operable in response to said last-mentioned signal voltage, an output member movable by said motive means, the amount of movement of said member corresponding to the integral of said first-mentioned signal for the time during which first-mentioned signal is applied, and indicating means operable by said member for indicating the distance traveled by said craft.

7. For use with a system for indicating the ground distance traveled by an aircraft, said system including means for developing a control signal corresponding to the ground speed of the craft; the combination comprising a motor driven at a predetermined speed, a second variable speed motor, signal developing means driven by said first and second-mentioned motors, signal input circuit means for said second motor including said driven means to supply counter balancing signals for maintaining the driven speed of said second motor at said predetermined speed, other means in circuit with said second motor for supplying said second motor with said first-mentioned control signal to drive said second motor at a speed which deviates from said predetermined speed by an amount corresponding to the ground speed of the craft, a synchro transmitter device operable by said first motor and adapted to develop a signal voltage corresponding to the speed of said first motor, a differential synchro device electrically coupled back-to-back with the output of said transmitter device and operable by said second motor for developing a signal voltage corresponding to the difference in speed of said motors, a synchro control transformer electrically coupled back-to-back with the output of said differential synchro device to receive said signal corresponding to said difference in speed and adapted to develop a signal voltage when the rotor of said control transformer is not in a null position, a servomotor operable in response to said last-mentioned signal voltage to displace said rotor towards a null position to reduce said last-mentioned signal voltage towards zero, the amount of movement of said member corresponding to the integral of said control signal for the time during which it is applied, and indicating means operable by said member for indicating distance traveled by said aircraft.

8. In combination, a constant speed motor, a synchro transmitter device having a rotor and a stator and adapted to have its input energized from a source of A. C. voltage, means for driving said rotor by said motor to develop a rotating magnetic field and an output signal in said transmitter device, the speed of rotation of said field corresponding to the speed of said motor, a variable speed motor, a differential synchro device having a rotor and a stator, means for driving said last-mentioned rotor by said variable speed motor, means for connecting the input of said differential synchro device back-to-back with the output of said transmitter device to receive said output signal to develop a signal corresponding to the difference in the speeds of said motors, and motive means displaceable in response to said last-mentioned signal to an extent corresponding to the difference in speeds of said motors.

9. In a system of the type described, a motor driven at a predetermined speed of operation, means responsive to the operation of said motor for developing a first A. C. output voltage corresponding to the speed of operation of said motor, an electronic amplifier having an input and an output, means for coupling said first output voltage to the input of said amplifier, a second motor connected to the output of said amplifier and responsive to said first output voltage, means responsive to the operation of said second motor for developing a second A. C. output voltage corresponding to the speed of operation of said second motor, means for coupling said second output voltage to the input of said amplifier in phase opposition when said first output voltage to combine said second output voltage with said first output voltage to produce a resultant voltage for controlling speed of operation of said second motor, and an impedance network connected between the output and input of said amplifier for substantially eliminating the out-of-phase voltage components produced by combining said output voltages at the input of said amplifier.

10. In a system according to claim 9 wherein said impedance network includes a condenser coupled between the output and input of said amplifier.

11. A control system comprising a constant speed motor, a variable speed motor, a first signal generator connected for operation by said constant speed motor for developing a signal corresponding to the operation of the constant speed motor, a second signal generator electrically associated with said first generator and connected for operation by said variable speed motor for developing a signal corresponding to the difference in speeds of both motors, motive means connected for operation in accordance with said last named signal, output circuits including a rate signal generator connected for operation by said constant speed motor for developing a control signal, a second rate signal generator connected for operation by said variable speed motor for developing a signal corresponding to the speed of the last motor, means connecting the output circuits of said rate signal generators for algebraically adding the last two signals to control the speed of said variable speed motor, variable resistance means in circuit with the outputs of said rate signal generators, and operator-operative coupling means for operatively connecting said motive means to said variable resistance means for varying the resistance thereof and the algebraic summation of said outputs to thereby maintain the speeds of said motors substantially constant.

12. A control system comprising a constant speed motor, a variable speed motor, a first signal generator connected for operation by said constant speed motor for developing a signal corresponding to the operation of the constant speed motor, a second signal generator electrically associated with said first generator and connected for operation by said variable speed motor for developing a signal corresponding to the difference in speeds of both motors, motive means connected for operation in accordance with said last named signal, output circuits including a rate signal generator connected for operation by said contact speed motor for developing a control signal, a second rate signal generator connected for operation by said variable speed motor for developing a signal corresponding to the speed of the last motor, means connecting the output circuits of said rate signal generators for algebraically adding the last two signals to control the speed of said variable speed motor, variable resistance means operatively connected in circuit with the outputs of said rate signal generators, coupling means operable to connect said motive means to said variable resistance means for varying the resistance thereof and the algebraic summation of said outputs to thereby maintain the speeds of said motors substantially constant, means for developing a third signal, switch means operable for connecting said third signal developing means into said output circuits to vary the speed of said variable speed motor, and means operable in one sense to render said coupling means effective and said switch means ineffective and in another sense to render said coupling means ineffective and said switch means effective as aforesaid.

References Cited in the file of this patent

UNITED STATES PATENTS

| | | |
|---|---|---|
| 2,356,051 | Hanna et al. | Apr. 15, 1944 |
| 2,480,065 | Wanner | Apr. 14, 1945 |
| 2,569,287 | Burgwin et al. | Sept. 25, 1951 |
| 2,596,698 | Laing et al. | May 13, 1952 |
| 2,614,392 | Bechberger et al. | Oct. 21, 1952 |
| 2,634,387 | Mercier | Apr. 7, 1953 |
| 2,670,157 | Peterson | Feb. 23, 1954 |

OTHER REFERENCES

Servo Mechanism Fundamentals; Lauer, Lesnick, Matson; McGraw-Hill, 1947; p. 38, Fig. 2.19.

"Electronic Instruments," Radiation Laboratory Series, vol. 21, Greenwood, Holdam, and Macrae, Fig. 3.5, p. 37.

U. S. DEPARTMENT OF COMMERCE
PATENT OFFICE

CERTIFICATE OF CORRECTION

Patent No. 2,830,243     Henry R. Walcott, Jr.     April 8, 1958

It is hereby certified that error appears in the printed specification of the above numbered patent requiring correction and that the said Letters Patent should read as corrected below.

Column 11, line 14, for "contact" read -- constant --.

Signed and sealed this 17th day of June 1958.

(SEAL)
Attest:
KARL H. AXLINE
Attesting Officer

ROBERT C. WATSON
Commissioner of Patents